United States Patent
Koizumi et al.

(10) Patent No.: US 6,268,043 B1
(45) Date of Patent: Jul. 31, 2001

(54) MAGNETIC RECORDING MEDIUM

(75) Inventors: Takeshi Koizumi; Miwako Sato; Norio Adachi, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/505,187

(22) Filed: Feb. 16, 2000

(30) Foreign Application Priority Data

Feb. 23, 1999 (JP) ................................................ 11-045320

(51) Int. Cl.$^7$ ....................................................... G11B 5/716
(52) U.S. Cl. ........................... 428/212; 428/216; 428/323; 428/336; 428/694 BU; 428/900
(58) Field of Search .................................. 428/212, 216, 428/694 BM, 900, 323, 336

(56) References Cited

U.S. PATENT DOCUMENTS 5,066,534 * 11/1991 Goto et al. ............................ 428/212
5,084,335 * 1/1992 Nakano et al. ...................... 428/323

FOREIGN PATENT DOCUMENTS 4-370521 * 12/1992 (JP) .
8-263166 * 4/1998 (JP) .

* cited by examiner

*Primary Examiner*—Stevan A. Resan
(74) *Attorney, Agent, or Firm*—Sonnnenschein, Nath & Rosenthal

(57) ABSTRACT

A magnetic recording medium which is capable of improving durability and reliability while satisfactory electromagnetic conversion characteristics are being maintained, the magnetic recording medium incorporating a non-magnetic support member; and a magnetic layer formed on the non-magnetic support member and mainly composed of magnetic powder and a binder and having a two-layer structure composed of a first magnetic layer and a second magnetic layer, wherein Young's modulus of the first magnetic layer is $140 \times 10^5$ N/m$^2$ to $160 \times 10^5$ N/m$^2$ and Young's modulus of the second magnetic layer is $45 \times 10^5$ N/m$^2$ to $50 \times 10^5$ N/m$^2$. The specific surface area of the magnetic powder for use in the first magnetic layer is 42 m$^2$/g to 46 m$^2$/g and the specific surface area of the magnetic powder for use in the second magnetic layer is 32 m$^2$/g to 35 m$^2$/g.

3 Claims, No Drawings

MAGNETIC RECORDING MEDIUM

BACKGROUND OF THE INVENTION

1. Field of the Invention

The present invention relates to a magnetic recording medium, and more particularly to a magnetic recording medium (and more particularly to a coating-type magnetic recording medium incorporating a magnetic coating film as a magnetic layer thereof), such as a magnetic tape or a magnetic disc, having a magnetic layer (in particular, a magnetic layer of a type containing magnetic powder and a binder as main components thereof) formed on a non-magnetic support member thereof.

2. Description of the Related Art

In recent years, magnetic recording mediums have been widely employed as recording mediums or storage mediums for audio apparatuses, video apparatuses, computers and the like. The need for the magnetic recording mediums has considerably been raised.

In general, a magnetic recording medium of the foregoing type has a structure that a magnetic layer composed of magnetic powder and a binder is formed on a non-magnetic support member made of polyester film and the like. In general, the magnetic layer is formed by applying or transferring, to the non-magnetic support member, a magnetic coating material, in which magnetic powder is dispersed in a composition containing a binder.

The magnetic layer is formed by, for example, coating a non-magnetic support member made of polyester or polyethylene terephthalate (PET) with a magnetic coating material prepared by dispersing powder of a magnetic alloy or the like, the main component of which is magnetic oxide, such as ferrite or chrome oxide, or Fe, Co or Ni in a binder made of organic polymer material.

The magnetic recording medium manufactured as described above is called a so-called coating type magnetic recording medium, which is required to improve the electromagnetic conversion characteristic thereof.

To realize excellent electromagnetic conversion characteristics of the magnetic recording medium of the foregoing type, enlargement of the output, elimination of noise and improvement of the surface characteristics are required. If the surface characteristics are improved, there arises a problem in that bias noise is intensified.

To prevent bias noise, it might be feasible to employ magnetic powder having a large specific surface area (SSA). In the foregoing case, the size of each of particles is reduced. Thus, the magnetic energy is reduced excessively to maintain a sufficiently high residual magnetic flux density. Therefore, there arises a problem in that reproduction output is reduced.

To prevent reduction in the reproduction output caused from an excessive spacing loss in a short wavelength region, minimization of asperities of the magnetic layer is required. If the surface characteristics are improved excessively, a defects in the movement, such as the foregoing bias noise, TN (Tape Noise) and stick, occur during movement of the tape. Therefore, an optimum coating film is required.

To meet the foregoing requirement, a contrivance has been suggested with which a magnetic layer having a multi-layered structure is employed.

A magnetic recording medium having a structure in which a first magnetic layer and a second magnetic layer are stacked on a non-magnetic support member will now be considered. Changes of the specific surface area of magnetic powder for use in the first magnetic layer and the second magnetic layer, the coercive force of each magnetic layer, the residual magnetic flux density and the film thickness permits satisfactory electromagnetic conversion characteristics to be obtained.

Although the electromagnetic conversion characteristics of the foregoing magnetic recording medium can somewhat be improved, both of satisfactory durability and excellent reliability cannot easily be realized while improved electromagnetic conversion characteristics are being maintained because of limitation of the manufacturing process. To realize satisfactory characteristics, magnetic powder and each magnetic layer must meet furthermore severe requirements.

SUMMARY OF THE INVENTION

In view of the foregoing, an object of the present invention is to provide a magnetic recording medium which is capable of simultaneously realizing satisfactory durability and excellent reliability while improved electromagnetic conversion characteristics are being maintained.

To achieve the above-mentioned object, according to one aspect of the present invention, there is provided a magnetic recording medium comprising: a non-magnetic support member; and a magnetic layer formed on the non-magnetic support member and mainly composed of magnetic powder and a binder and having a two-layer structure composed of a first magnetic layer and a second magnetic layer, wherein Young's modulus of the first magnetic layer is $140 \times 10^5$ $N/m^2$ to $160 \times 10^5$ $N/m^2$ and Young's modulus of the second magnetic layer is $45 \times 10^5$ $N/m^2$ to $50 \times 10^5$ $N/m^2$.

Since the Young's modulus of the first magnetic layer satisfies the above-mentioned range, a satisfactory durability can be improved and required contact with a magnetic head can be maintained. Moreover, reduction in the bonding strength can be prevented.

Since the Young's modulus of the secured magnetic layer satisfies the above-mentioned range, a problem of separation of the coating film can be prevented. Moreover, a problem of sticking can be prevented.

Other objects, features and advantages of the invention will be evident from the following detailed description of the preferred embodiments described in conjunction with the attached drawings.

DESCRIPTION OF THE PREFERRED EMBODIMENTS

An embodiment of a magnetic recording medium according to the present invention will now be described.

The magnetic recording medium according to the present invention is a so-called coating-type magnetic recording medium having a magnetic layer formed by applying a magnetic coating material.

A main characteristic of the magnetic layer lies in that it has a two-layer structure composed of a first magnetic layer and a secured magnetic layer each of which has an appropriate Young's modulus.

Specifically, the Young's modulus of the first magnetic layer is $140 \times 10^5$ $N/m^2$ to $160 \times 10^5$ $N/m^2$ and the Young's modulus of the second magnetic layer is $45 \times 10^5$ $N/m^2$ to $50 \times 10^5$ $N/m^2$.

As the Young's modulus of the first magnetic layer is enlarged, the durability can furthermore be improved. If the Young's modulus is higher than $160 \times 10^5$ $N/m^2$, satisfactory contact with the magnetic head cannot be maintained. In the foregoing case, the difference in the output level between the right and left channels (Rch and Lch) is enlarged excessively and/or reduction in the bonding strength occurs. If the Young's modulus is lower than $140 \times 10^5$ N/m$^2$, sticking easily occurs. Therefore, satisfactory movement characteristics cannot be realized.

If the Young's modulus of the second magnetic layer is higher than $50 \times 10^5$ N/m$^2$, the bonding strength, which is a physical characteristic, is reduced. Thus, separation of the coating film sometimes occurs. If the Young's modulus of the second magnetic layer is lower than $45 \times 10^5$ N/m$^2$, sticking easily occurs similar to the structure in which the Young's modulus of the first magnetic layer is low.

Ferromagnetic powder can be used as magnetic powder for constituting the magnetic layer of the magnetic recording medium according to the present invention. The ferromagnetic powder is exemplified by: ferromagnetic metal powder, such as metal, such as Fe, Co or Ni or an alloy containing the foregoing metal; plate-like hexagonal ferrite, such as barium ferrite; γ-iron oxide; γ-iron oxide containing cobalt: magnetite; magnetite containing cobalt; and $CrO_2$.

To obtain satisfactory output characteristics and bias noise, it is preferable that the specific surface area (a BET value) of magnetic powder for use in the first magnetic layer is 42 m$^2$/g to 46 m$^2$/g and that of the magnetic powder for use in the second magnetic layer is 32 m$^2$/g to 35 m$^2$/g.

The first magnetic layer mainly contributes to the bias noise level and the transferring characteristic among the electromagnetic conversion characteristics. If the specific surface area of employed magnetic powder is larger than 46 m$^2$/g, the transfer level deteriorates. If the specific surface area is smaller than 42 m$^2$/g, a satisfactory bias noise level cannot be maintained.

The second magnetic layer mainly contributes to the output level and the bias noise among the electromagnetic conversion characteristics. To raise the output level, it is preferable that magnetic powder having smaller specific surface area and greater magnetic energy is employed. If the specific surface area is smaller than 32 m$^2$/g, the bias noise level deteriorates. If the specific surface area is larger than 35 m$^2$/g, the magnetic energy is undesirably reduced. In the foregoing case, a satisfactory output level cannot be maintained. When the specific surface area is changed, the dispersion characteristic of the coating material and the Young's modulus are changed.

From the above-mentioned viewpoints, it is preferable that the Young's modulus of the first magnetic layer is $140 \times 10^5$ N/m$^2$ to $160 \times 10^5$ N/m$^2$ and that of the second magnetic layer is $45 \times 10^5$ N/m$^2$ to $50 \times 10^5$ N/m$^2$. Moreover, it is preferable that the specific surface area of magnetic powder for use in the first magnetic layer is 42 m$^2$/g to 46 m$^2$/g and that of the second magnetic layer is 32 m$^2$/g to 35 m$^2$/g.

Although greater reproduction output can be obtained as the thickness of each magnetic layer is enlarged, the transfer characteristic and the frequency characteristic deteriorate. Therefore, an optimum thickness must be selected.

From the above-mentioned viewpoint, it is preferable that the thickness of the first magnetic layer is 1.0 μm to 2.5 μm and that of the second magnetic layer is 2.0 μm to 4.0 μm. If the thickness of each magnetic layer does not satisfy the foregoing range, the bias noise characteristic and the reproduction output characteristic cannot simultaneously satisfactorily be maintained. What is worse, the transfer characteristic deteriorates.

The ferromagnetic powder of the magnetic recording medium according to the present invention is dissolved in predetermined organic solvent together with a binder so as to be formed into a coating material. The foregoing magnetic coating material is applied to the surface of the non-magnetic support member so that the coating film is formed into the magnetic layer.

The binder for use in the magnetic layer may any one of known binders for use in a usual coating-type magnetic recording medium. The known binder is exemplified by polyurethane resin, such as polyester resin, polycarbonate resin or polyether resin; polyester resin; vinylchloride copolymer; cellulose derivative; phenoxy resin; acrylic ester copolymer; vinylidene chloride copolymer; and styrene-butadiene copolymer.

To realize satisfactory dispersion characteristics, a portion or the overall portion of the employed binder may contain the foregoing hydrophilic polar group. It is preferable that the quantity of the polar group is 0.03 mmol to 0.3 mmol per 1 g of the binder. If the quantity is smaller than 0.03 mmol per 1 g of the binder, an effect for improving the dispersion characteristic is insufficient. If the quantity is larger than 0.3 mmol per 1 g of the binder, the moisture absorption characteristic and weather resistance deteriorate. What is worse, the dispersion characteristic sometimes deteriorates. One or more types of the polar group may be contained.

The hydrophilic polar group is exemplified by —COOM, —SO$_3$M, —O—SO$_3$M, —P=O(OM)$_2$, —O—P=O(OM)$_2$, —NR$_4$X, —NR$_2$ and —SH [where M is any one of H, Li, Na, K, —NR$_4$ (R is an alkyl group or H) and X is a halogen atom].

To form a crosslinked structure in the binder, polyisocyanate or the like may be added. The polyisocyanate may be isocyanate, such as tolylene diisocyanate, 4,4'-diphenylmethane diisocyanate, hexamethylene diisocyanate, xylene diisocyanate or isophorone diisocyanate; an adduct of the isocyanate and polyalcohol, such as trimethylol propane; or a product of condensation.

In addition to the binder and magnetic powder, the magnetic layer may be added with additives including an abrasive material, lubricant and carbon black.

The abrasive material is exemplified by alumina, chrome oxide, titanium oxide, α-iron oxide, silicon carbide, corundum and (synthetic diamond).

The abrasive material in a powder state may be added to a magnetic coating material. As an alternative to this, the abrasive material in a dispersed slurry state may be added in an initial stage of a mixture and dispersion process of the magnetic coating material, an intermediate stage of the same or a final stage of the same.

The lubricant is exemplified by higher fatty acid, such as myristic acid or stearic acid; salt of the higher fatty acid and metal or amine; an ester compound of fatty acid and mono- to sexivalent alcohol; silicon oil including a type denatured with fatty acid or the like; alkyl phosphoric ester (another substitutional group, such as an ether bond, may be contained by adding ethylene oxide or fluorine may be contained partially); perfluoropolyether; and its denatured material. As an alternative to this, solid lubricant made of molybdenum disulfide or graphite may be employed.

Moreover, a variety of known raw materials may be employed which are exemplified by carbon black with which an antistatic effect and a light shielding effect can be obtained; and materials with which an effect of preventing friction, a dispersion effect, an effect of enhancing crosslinking and a plasticizing effect can be obtained.

Solvent for obtaining a coating material is exemplified by ketone, such as methylethylketone or cyclohexane; alcohol, such as methanol or isopropyl alcohol; ester, such as ethyl acetate or butyl acetate; aromatic hydrocaron, such as toluene or benzene; chlorinated hydrocarbon, such as carbon tetrachloride or chloroform; and ether, such as dioxine or ethylene glycol monoethylether.

The non-magnetic support member which is coated with the magnetic coating material composed of the foregoing components may be made of polyester, such as polyethylene terephthalate or polyethylene naphthalate; polyamide or imide, such as aramide; polyolefine, such as polypropylene; cellulose, such as cellulose triacetate; polycarbonate; other plastic resin; metal, such as aluminum; and ceramic, such as glass.

EXAMPLES

Examples will now be described by describing results of experiments.

Example 1

Two types of magnetic coating materials A and B were prepared in accordance with the following basic compositions.

| Composition of Magnetic Coating Material A | |
|---|---|
| ferromagnetic powder | 100 parts by weight |
| vinyl chloride copolymer | 70 parts by weight |
| polyester polyurethane | 30 parts by weight |
| isocyanate compound | 15 parts by weight |
| phosphoric ester | 1.0 part by weight |
| silane coupling agent | 1.0 part by weight |
| carbon | 3.0 part by weight |
| alumina | 2.0 part by weight |
| stearate | 0.4 part by weight |
| myristic acid | 0.2 part by weight |
| Composition of Magnetic Coating Material B | |
| ferromagnetic powder | 100 parts by weight |
| vinyl chloride copolymer | 50 parts by weight |
| polyester polyurethane | 50 parts by weight |
| isocyanate compound | 10 parts by weight |
| phosphoric ester | 1.0 part by weight |
| silane coupling agent | 1.0 part by weight |
| myristic acid | 0.5 part by weight |

The magnetic coating material was prepared in such a manner that the foregoing ratio was realized with respect to 6 kg of ferromagnetic powder. Then, each magnetic coating material was pre-mixed by an extruder, and then dispersed and mixed by a sand mill so that magnetic coating materials A and B were prepared.

Either surface of the non-magnetic support member having a thickness of 11.7 μm was simultaneously coated with magnetic coating materials A and B to form a two-layer structure. Then, orientation and drying were performed in a magnetic field, the intensity of which was 4 k Oe.

Then, a calender process was performed under conditions that the coating material was 100° C. and the pressure was 40 kg/cm² so that a first magnetic layer and a second magnetic layer were formed.

Then, each of the obtained materials was cut to have a width of 1/8 inch so that magnetic tapes were manufactured. Note that magnetic coating material A contained ferromagnetic powder having a specific surface area of 42 m²/g as the magnetic powder in the first magnetic layer. Magnetic coating material B contained ferromagnetic powder having a specific surface area of 32 m²/g as the magnetic powder in the second magnetic layer. The thickness of the first magnetic layer was 2 μm, while the thickness of the second magnetic layer was 3 μm.

Example 2

A magnetic tape was manufactured similarly to Example 1 except for the specific surface area of the ferromagnetic powder in the first magnetic layer which was 45 m²/g and the specific surface area of the ferromagnetic powder in the second magnetic layer which was 33 m²/g.

Example 3

A magnetic tape was manufactured similarly to Example 1 except for the specific surface area of the ferromagnetic powder in the first magnetic layer which was 46 m²/g and the specific surface area of the ferromagnetic powder in the second magnetic layer which was 35 m²/g.

Comparative Example 1

A magnetic tape was manufactured similarly to Example 1 except for the specific surface area of the ferromagnetic powder in the first magnetic layer which was 40 m²/g and the specific surface area of the ferromagnetic powder in the second magnetic layer which was 33 m²/g.

Comparative Example 2

A magnetic tape was manufactured similarly to Example 1 except for the specific surface area of the ferromagnetic powder in the first magnetic layer which was 45 m²/g and the specific surface area of the ferromagnetic powder in the second magnetic layer which was 30 m²/g.

Comparative Example 3

A magnetic tape was manufactured similarly to Example 1 except for the specific surface area of the ferromagnetic powder in the first magnetic layer which was 45 m²/g and the specific surface area of the ferromagnetic powder in the second magnetic layer which was 37 m²g.

Comparative Example 4

A magnetic tape was manufactured similarly to Example 1 except for the specific surface area of the ferromagnetic powder in the first magnetic layer which was 48 m²/g and the specific surface area of the ferromagnetic powder in the second magnetic layer which was 33 m²/g.

The electromagnetic conversion characteristics, the durability and sticking of each of the obtained magnetic tapes were examined. The electromagnetic conversion characteristics were evaluated by a method conforming to JIS C5566 (IEC 94-5). A cassette deck TC-KA7ES, which was trade name of SONY, was employed. The measured values were relative values when the reference output level was 0 dB. As the output level was raised, a furthermore satisfactory result was obtained. As the bias noise level was lowered, a furthermore satisfactory result was obtained. As for the transfer characteristic, the result was improved as the value was enlarged.

The Young's modulus was calculated in accordance with the following equation. The Young's modulus was measured by a method conforming to JIS C5565 (IEC94-4). The measurement was performed by using a measuring machine NMB Model TCM-200CR (TYPE: RC-9001).

Relational Equation for Calculating Young's Modulus $$EtTt = E_1T_1 + E_2T_2 + E_bT_b$$

where ET is the overall Young's modulus of the coating film, E1 is the Young's modulus of the first magnetic layer, E2 is the Young's modulus of the second magnetic layer, Eb is the Young's modulus of the non-magnetic support member, Tt is the overall thickness, T1 is the thickness of the first magnetic layer, T2 is the thickness of the second magnetic layer and Tb is the thickness of the non-magnetic support member.

The state of separation of powder was evaluated such that each of the manufactured samples was loaded into a cassette case so as to repeatedly be moved in a cassette deck (TC-KA5ES which is a trade name of SONY). The state realized after each sample was allowed to pass the head 100 times was evaluated visually. Mark ○ was given to each of satisfactory results, Δ was given to each of unsatisfactory results and X was given to each of defective results.

The sticking and the bonding strength were evaluated by a method conforming to JIS C5565 (IEC94-4) such that a comparison with a reference tape was made. Mark ○ was given to each of satisfactory results, Δ was given to each of unsatisfactory results and X was given to each of defective results.

Results were shown in Table 1.

TABLE 1

|  | Example 1 | Example 2 | Example 3 |
|---|---|---|---|
| Specific Surface Area of First Magnetic Layer ($m^2/g$) | 42 | 45 | 46 |
| Specific Surface Area of Second Magnetic Layer ($m^2/g$) | 32 | 33 | 35 |
| Young's Modulus of First Magnetic Layer × $10^5 N/m^2$ | 160 | 148 | 140 |
| Young's Modulus of Second Magnetic Layer × $10^5 N/m^2$ | 50 | 48 | 45 |
| Output Level (dB) | +0.8 | +0.6 | +0.5 |
| Bias Noise (dB) | −0.5 | −0.8 | −0.8 |
| Separation of Powder | ○ | ○ | ○ |
| Sticking | ○ | ○ | ○ |
| Transference (dB) | +0.5 | +0.2 | +0.2 |
| Bonding Strength | ○ | ○ | ○ |

|  | Comparative Example 1 | Comparative Example 2 | Comparative Example 3 | Comparative Example 4 |
|---|---|---|---|---|
| Specific Surface Area of First Magnetic Layer ($m^2/g$) | 40 | 45 | 45 | 48 |
| Specific Surface Area of Second Magnetic Layer ($m^2/g$) | 33 | 30 | 37 | 33 |
| Young's Modulus of First Magnetic Layer × $10^5 N/m^2$ | 166 | 148 | 148 | 128 |
| Young's Modulus of Second Magnetic Layer × $10^5 N/m^2$ | 48 | 54 | 40 | 48 |
| Output Level (dB) | +1.0 | +0.6 | −0.1 | −0.4 |

TABLE 1-continued

| Bias Noise (dB) | +0.5 | +0.2 | −0.6 | −1.0 |
| Separation of Powder | X | Δ | ○ | Δ |
| Sticking | ○ | ○ | X | X |
| Transference (dB) | +0.5 | +0.3 | +0.0 | −2.0 |
| Bonding Strength | X | X | ○ | ○ |

As can be understood from Table 1, separation of powder occurred excessively when the Young's modulus of the first magnetic layer was higher than $160 \times 10^5$ N/m². If the foregoing Young's modulus was lower than $140 \times 10^5$ N/m², sticking easily occurred and the movement characteristics deteriorated.

A fact was detected that the specific surface area of the ferromagnetic powder for use in the first magnetic layer must be 42 m²/g to realize satisfactory bias noise lower than that of the reference tape.

Another fact was detected that the bias noise was substantially a constant level when the specific surface area of the ferromagnetic powder for use in the second magnetic layer was not lower than 32 m²/g. Thus, the bias noise was satisfactorily prevented.

As the specific surface area of the ferromagnetic powder for use in the second magnetic layer was reduced, the Young's modulus was raised. When the Young's modulus was higher than $50 \times 10^5$ N/m², separation of powder occurred excessively. When the Young's modulus was lower than $45 \times 10^5$ N/m², sticking easily occurred. Thus, an adverse influence was exerted on the movement characteristic.

As described above, the present invention has the structure that the magnetic layer has the two-layer structure and the Young's modulus of each magnetic layer has the appropriate value. Therefore, excellent characteristics including the durability and reliability can be obtained while satisfactory electromagnetic conversion characteristics are being maintained.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic recording medium comprising:
   a non-magnetic support member; and
   a magnetic layer formed on said non-magnetic support member and mainly composed of magnetic powder and a binder and having a two-layer structure composed of a first magnetic layer and a second magnetic layer, wherein
   Young's modulus of said first magnetic layer is $140 \times 10^5$ N/m² to $160 \times 10^5$ N/m² and
   Young's modulus of said second magnetic layer is $45 \times 10^5$ N/m² to $50 \times 10^5$ N/m².

2. A magnetic recording medium according to claim 1, where the specific surface area of the magnetic powder for use in said first magnetic layer is 42 mn²/g to 46 m²/g and the specific surface area of the magnetic powder for use in said second magnetic layer is 32 m²/g to 35 m²/g.

3. A magnetic recording medium according to claim 1, wherein the thickness of said first magnetic layer is 1.0 μm to 2.5 μm and the thickness of said second magnetic layer is 2.0 μm to 4.0 μm.

* * * * *